United States Patent [19]
Richards

[11] Patent Number: 5,208,669
[45] Date of Patent: May 4, 1993

[54] UP-CONVERSION OF A VIDEO SIGNAL FORMAT WITH EXPANSION OF ACTIVE PORTION OF VIDEO FIELD

[75] Inventor: John W. Richards, Stockbridge, United Kingdom

[73] Assignee: Sony Broadcast & Communications Limited, Basingstoke, Great Britain

[21] Appl. No.: 816,561

[22] Filed: Jan. 3, 1992

[30] Foreign Application Priority Data

Jan. 8, 1991 [GB] United Kingdom ............... 9100314

[51] Int. Cl.$^5$ .......................................... H04N 7/01
[52] U.S. Cl. .................................. 358/140; 358/180; 358/160
[58] Field of Search ............... 358/140, 180, 160, 22, 358/138

[56] References Cited

U.S. PATENT DOCUMENTS

| | | | |
|---|---|---|---|
| 3,497,760 | 2/1970 | Kiesling | 358/93 X |
| 4,703,440 | 10/1987 | Birk et al. | 358/140 X |
| 5,084,765 | 1/1992 | Morita et al. | 358/180 X |
| 5,087,971 | 2/1992 | Sakata et al. | 358/160 |

FOREIGN PATENT DOCUMENTS

0414596A1 2/1991 European Pat. Off. .

Primary Examiner—Victor R. Kostak
Attorney, Agent, or Firm—Alvin Sinderbrand; William S. Frommer

[57] ABSTRACT

A digital video signal is real-time converted from a conventional definition format, such as 525 lines, 60 field/s, 2:1 interlace, with a 4:3 aspect ratio and 720×486 active pixels, to a high definition format, such as 1125 lines, 60 field/s, 2:1 interlace, with a 16:9 aspect ratio and 1920×1035 active pixels by writing the pixels of the conventional definition fields to alternate field stores at the conventional definition format pixel rate; by formed intermediate frames in the high definition format by reading pixels from the field store which is not being written at the high definition pixel rate and adding background pixel data between the lines of the read pixels and between the fields of the read pixels; by translating the pixels of the intermediate image, if necessary; and by expanding the image so that the originating pixel data extends across the whole frame in at least one direction.

23 Claims, 4 Drawing Sheets

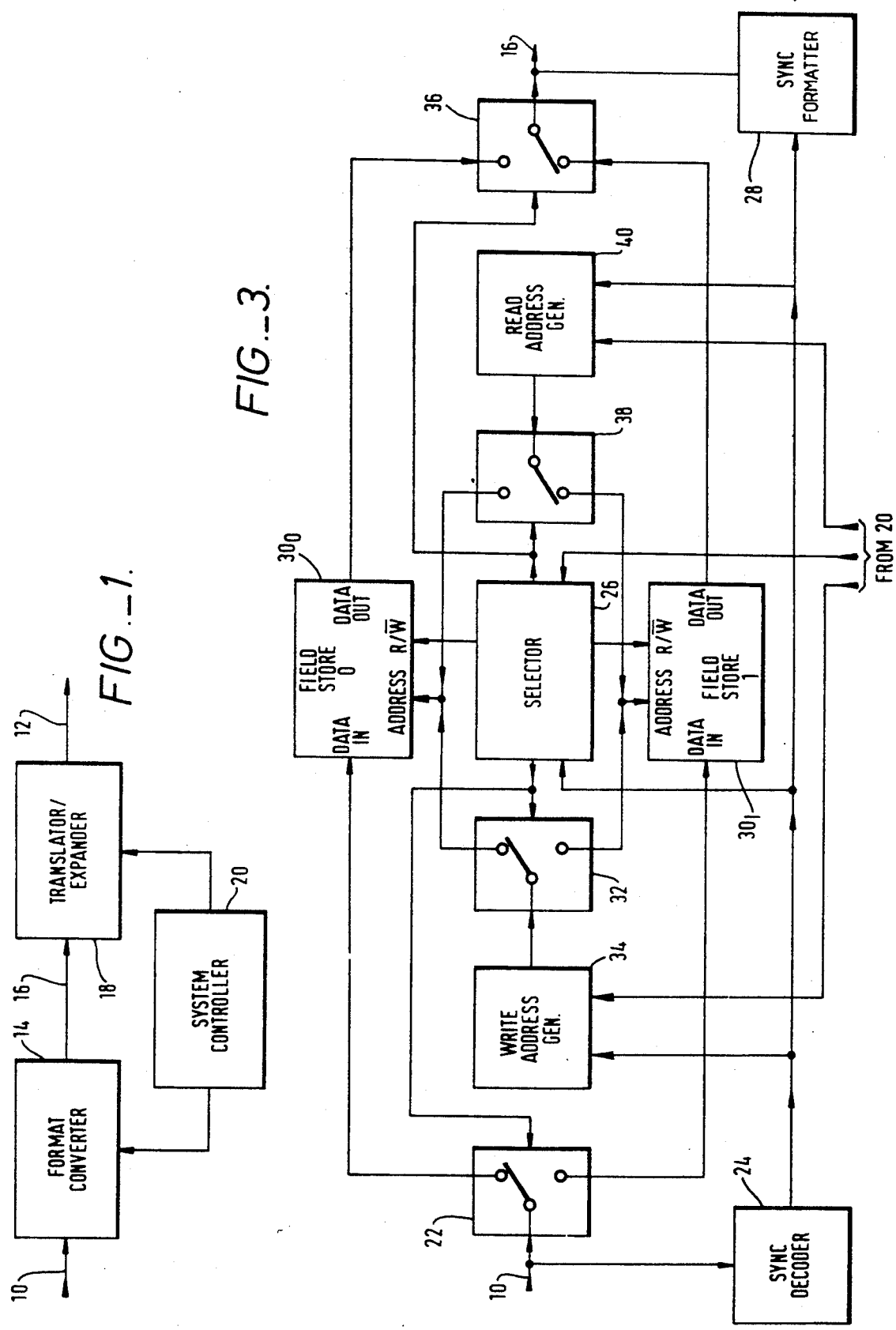

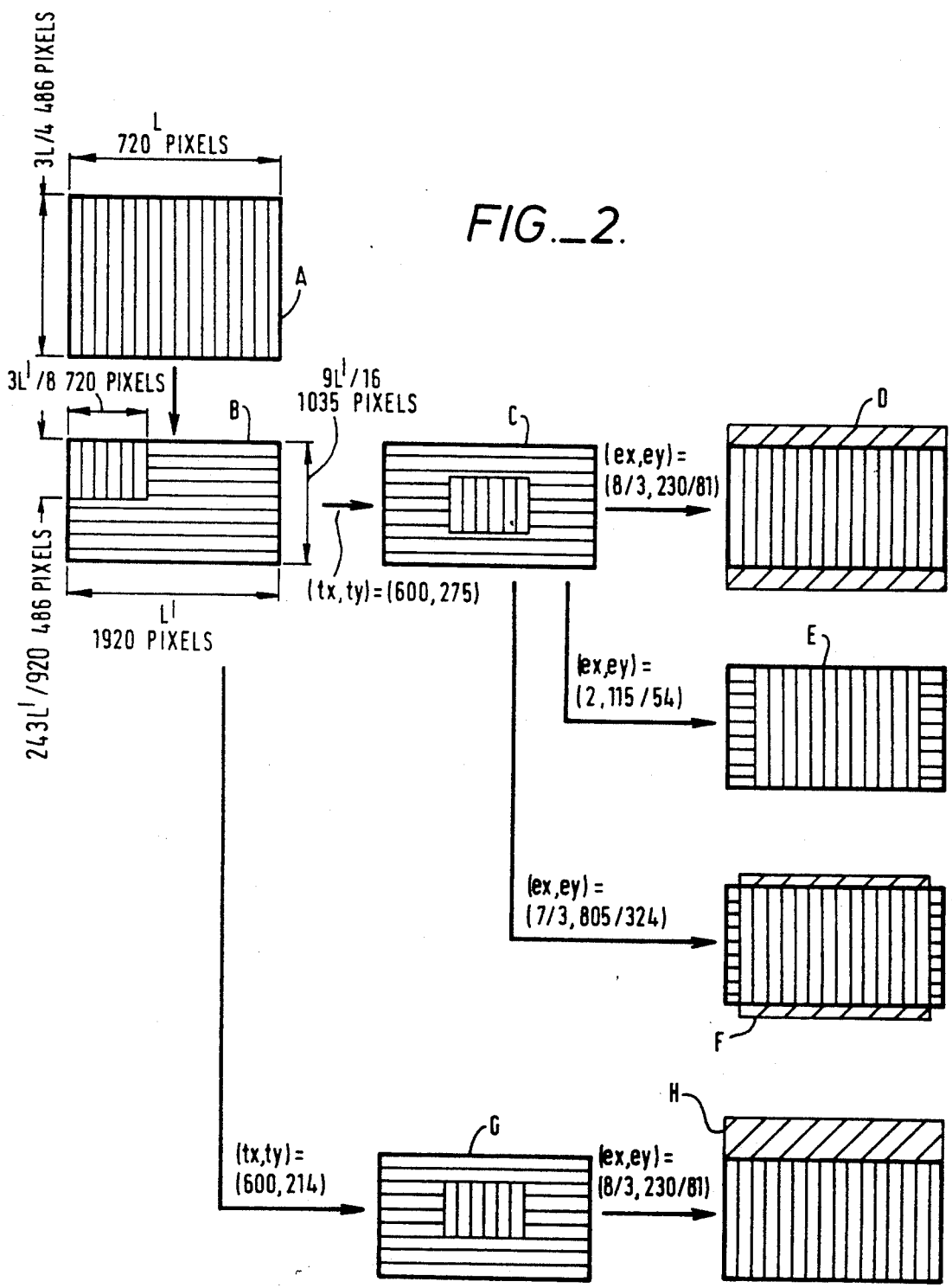

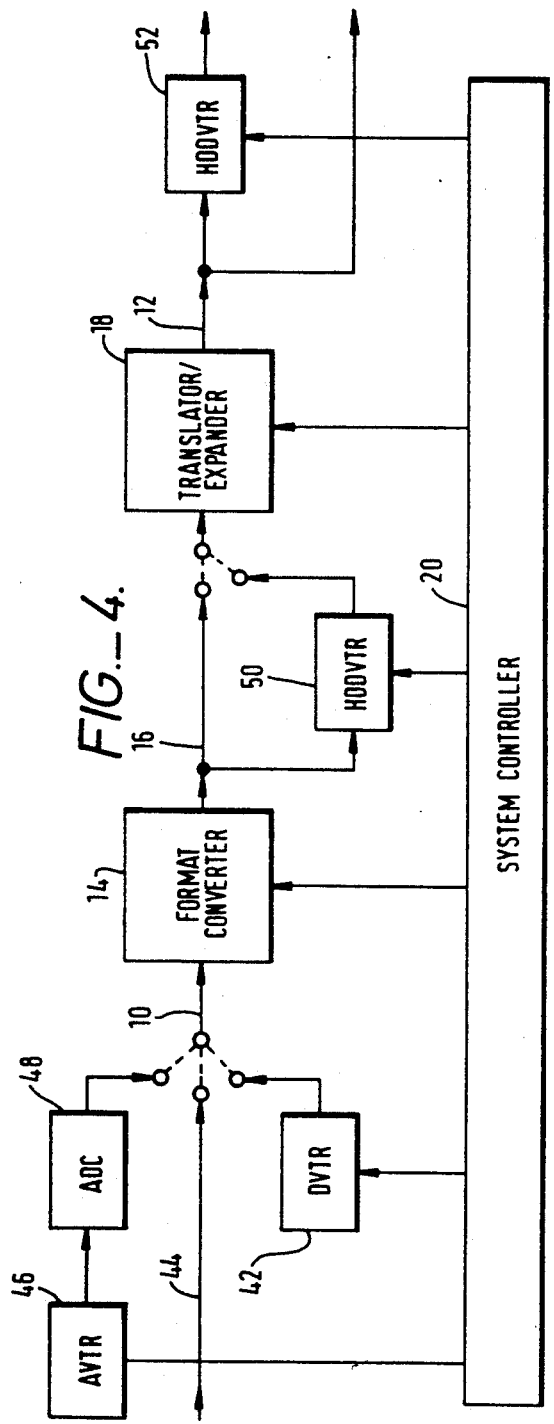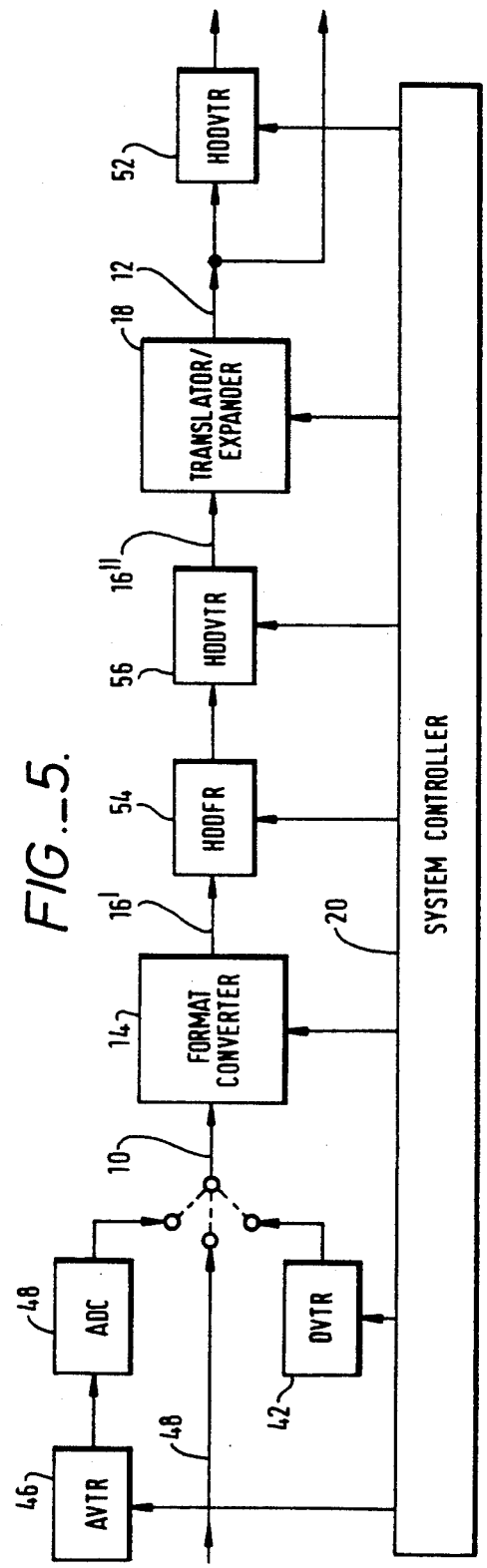

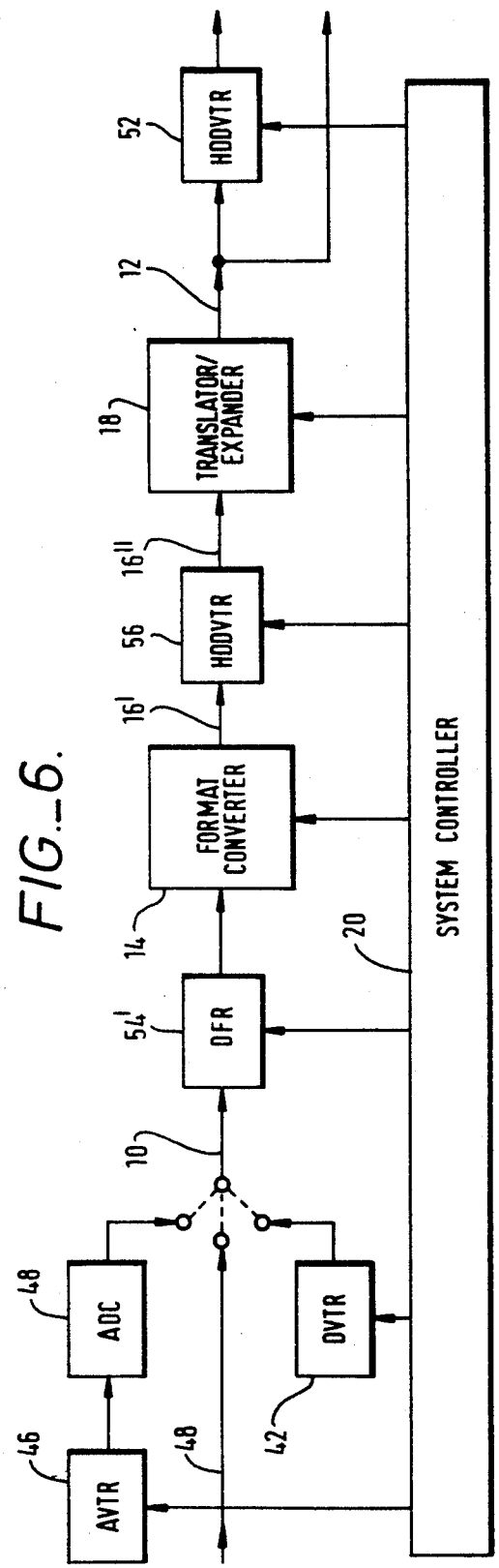
FIG._6.

UP-CONVERSION OF A VIDEO SIGNAL FORMAT WITH EXPANSION OF ACTIVE PORTION OF VIDEO FIELD

BACKGROUND OF THE INVENTION

1. Field of the Invention

This invention relates to up-conversion of digital video signals from a conventional format to a high-definition format.

2. Description of the Prior Art

High definition digital video is becoming increasingly popular, and common formats for the video signals are:

SMPTE 240 M format, which is characterised by 1125 lines, 60 field/s, 2:1 interlace, with a 16:9 aspect ratio and 1920×1035 active pixels per frame; and European HDTV format, which is characterised by 1250 lines, 50 field/s, 2:1 interlace, with a 16:9 aspect ratio and 1920×1152 active pixels per frame.

More and more material is being originated in these formats for processing and/or distribution in them. However, there is obviously a great bulk of material which has been originated, or still needs to be originated, in conventional definition format, and there is a desirability to be able to up-convert such material to high definition format so that it can be integrated with other high definition material and/or so that it can be distributed in high definition format. Examples of conventional definition digital formats are:

CCIR 601 525-line format, which is characterised by 525 lines, 60 field/s, 2:1 interlace, with a 4:3 aspect ratio and 720 ×486 active pixels per frame;

CCIR 601 625-line format, which is characterised by 625 lines, 50 field/s, 2:1 interlace, with a 4:3 aspect ratio and 720 ×576 active pixels per frame;

4fsc 525 D2 format, which is characterised by 525 lines, 60 field/s, 2:1 interlace, with a 4:3 aspect ratio and 768×486 active pixels per frame; and 4fsc 625 D2 format, which is characterised by 625 lines, 60 field/s, 2:1 interlace, with a 4:3 aspect ratio and 948×576 active pixels per frame.

Problems associated with such up-conversion include dealing with the change of aspect ratio from 4:3 to 16:9, in addition to dealing with the changes of resolution, which are different in the horizontal and vertical directions, and providing temporal conversion in the case of a change in field rate.

OBJECT AND SUMMARY OF THE INVENTION

In accordance with one aspect of the present invention, there is provided an apparatus for up-converting a digital video signal from a first definition format to a second high-definition format, comprising: storage means which can store an input field/frame of pixel data in the first format; storage control means for controlling the storage means to output the stored pixel data together with dummy data as an intermediate field/frame in the second format, such that the pixel data occupies a continuous active portion of the intermediate field/frame and the dummy data occupies the remainder of the intermediate field/frame; and means for processing the intermediate field/frame by expanding the active portion thereof in the vertical and horizontal directions and producing an output field/frame in the second format such that the pixel data extends across substantially the whole of the output field/frame in at least one of the two directions.

The apparatus is of particular application in converting digital video signals between formats having different aspect ratios, and in this case the processing means may be arranged to be operable in a side-bar mode to expand the active portion of the intermediate field/frame to an extent such that the active portion extends across substantially the whole of the output field/frame in one of the directions and such that the dummy data occupies at least one marginal portion of the output field/frame. Alternatively or additionally, the processing means may be arranged to be operable in an edge-crop mode to expand the active portion of the intermediate field/frame to an extent such that the active portion extends across substantially the whole of the output field/frame in one of the directions and across more than the output field/frame in the other direction so that at least one marginal portion of the active portion is cropped. Alternatively or additionally, the processing means may be arranged to be operable in a zoom mode to expand the active portion of the intermediate field/frame to an extent such that the active portion extends across more than the whole of the output field/frame in one of the directions and across less than or more than the output field/frame in the other direction.

Preferably, the processing means is operable in the side-bar, edge-crop or zoom mode, as the case may be, to expand the intermediate field/frame with different horizontal and vertical expansions such that the ratio of the horizontal to vertical expansion is equal to the ratio of the pixel aspect ratio of the first format to that of the second format. Alternatively or additionally, the processing means may be arranged to be operable in a titles mode to expand the active portion of the intermediate field/frame to an extent such that the active portion extends across substantially the whole of the output field/frame in both of the directions without any substantial cropping of the active portion. The processing means may include means to select operation in any one of the modes.

In one embodiment, in which the storage means can store a field/frame of pixel data in the second format, and the storage control means includes means to select writing to and reading from the storage means and means for generating addresses for the storage means; the address generating means is operable, (a) when writing is selected, to generate addresses sequentially for the active portion of storage means corresponding to a field/frame in the first format, and (b) when reading is selected, to generate addresses sequentially corresponding to a field/frame in the second format; and the storage means stores the dummy data at addresses not in the active portion thereof.

In an alternative embodiment, in which the storage control means includes means to select writing to and reading from the storage means, and means for generating addresses for the storage means, the address generating means is operable (a) when writing is selected, to generate addresses sequentially for the field/frame of pixel data, and (b) when reading is selected, to generate intermittently lines of addresses corresponding to lines of addresses of the field/frame in the first format. The storage control means is operable to output partial lines of the dummy pixel data between the generation of one line of addresses and the next, and to output lines of the dummy pixel data between the generation of one field/frame of addresses and the next. This embodiment has the advantage that the size of the storage means is related to the number of pixels in a field frame in the first format, rather than the larger number of pixels in a field/frame in the second format.

In either of these embodiments, a further such storage means may be provided, with the storage control means controlling the two storage means such that while one is being written to, the other is being read from, and vice versa. This has the advantage that, at least for some types of conversion, the apparatus can operate continuously.

Also, with any of these embodiments, the apparatus may be arranged so that when writing of the, or one of the, storage means is selected, the addresses for the storage means are generated at the pixel rate of the first format; and when reading of the, or one of the, storage means is selected, the addresses for that storage means are generated at the pixel rate of the second format. This enables realtime operation of the apparatus.

In accordance with another aspect of the present invention, there is provided a method of up-converting a digital video signal from a first definition format to a second high-definition format. The method comprises the steps of storing an input field/frame of pixel data in the first format; reading the stored pixel data interspersed with dummy data as an intermediate field/frame in the second format, such that the previously stored pixel data occupies a continuous active portion of the intermediate field/frame and the dummy data occupies the remainder of the intermediate field/frame; and expanding the active portion of the intermediate field/frame in the vertical and horizontal directions and producing an output field/frame in the second format such that the previously stored pixel data extends across substantially the whole of the output field/frame in at least one of the two directions.

In the case where the first and second formats have different field/frame aspect ratios, in the expansion step the active portion of the intermediate field/frame may be expanded in a side-bar mode to an extent such that the active portion extends across substantially the whole of the output field/frame in one of the directions and such that the dummy data occupies at least one margin portion of the output field/frame. Alternatively, the active portion of the intermediate field/frame may be expanded in an edge-crop mode to an extent such that the active portion extends across substantially the whole of the output field/frame in one of the directions and across more than the output field/frame in the other direction so that at least one marginal portion of the active portion is cropped. Alternatively, the active portion of the intermediate field/frame may be expanded in a zoom mode to an extent such that the active portion extends across more than the whole of the output field/frame in one of the directions and across less than or more than the output field/frame in the other direction. In any of these modes, in the expansion step the intermediate field/frame is preferably expanded with different horizontal and vertical expansions such that the ratio of the horizontal to vertical expansion is equal to the ratio of the pixel aspect ratio of the first format to that of the second format. Alternatively, the active portion of the intermediate field/frame may be expanded in a titles mode to an extent such that the active portion extends across substantially the whole of the output field/frame in both of the directions without any substantial cropping of the active portion. The method may further comprise the step of selecting operation in any one of the above modes.

In one embodiment, the storing step includes the step of generating for a storage means addresses which are sequential for the field/frame of pixel data in the first format; and the reading step includes the steps of: generating for the storage means intermittently lines of addresses corresponding to lines of addresses int he first format; outputting partial lines of the dummy pixel data between the generation of one line of addresses and the next; and outputting lines of the dummy pixel data between the generation of one field/frame of addresses and the next. In an alternative embodiment, the storing step includes the step of generating for a storage means addresses which are sequential for an active portion of storage means corresponding to a field/frame in the first format; the reading step includes the step of generating for the storage means addresses which are sequential for a field/frame in the second format; and an initialisation step is provided in which the dummy data is stored at addresses in the storage means not in the active portion thereof. In either of these embodiments, in the storing step, the addresses are preferably generated at the pixel rate of the first format; and in the reading step, the addresses are preferably generated at the pixel rate of the second format.

The method preferably further comprises the step of adding synchronisation data to the pixel data of the intermediate field/frame.

Other objects, features and advantages of the present invention will become apparent upon consideration of the following detailed description of a preferred embodiment thereof, especially when considered with the accompanying drawings in which like reference numerals are employed to designate the same or similar components in the different figures.

BRIEF DESCRIPTION OF THE DRAWINGS

FIG. 1 is a basic block diagram of an up-converter apparatus;

FIG. 2 illustrates various frames arising in the apparatus;

FIG. 3 is a block diagram of a format converter forming part of the apparatus of FIG. 1;

FIG. 4 is a block diagram of a system for up-converting a 525-lines 60 field/s video signal to an 1125-lines 60 field/s digital format;

FIG. 5 is a block diagram of a system for up-converting a 625-lines 50 field/s video signal to an 1125-lines 60 field/s digital format; and FIG. 6 shows a modification to the system of FIG. 5.

DETAILED DESCRIPTION OF THE PREFERRED EMBODIMENT

Referring to FIG. 1, an apparatus is shown for up-converting an input conventional definition CCIR 601 525-line format digital video signal on input line 10 to an output high definition SMPTE 240 M format digital video signal on output line 12. The input signal format is characterised by 525 lines, 60 field/s, 2:1 interlaced, and each frame has an active area of 720 (H) pixels×486 (V) pixels with a 4(H):3(V) frame aspect ratio, as shown by the vertically hatched frame A in FIG. 2. It will be appreciated, therefore, that the input frame size is L×3L/4 (where L is the width of the input frame). Also, each input pixel has an aspect of 4/720(H):/486(V), or 9:10. It will be noted that the input pixels are not square. The output signal format is characterised by 1125 lines, 60 field/s, 2:1 interlaced, and each frame has an active area of 1920(H) pixels×1035(V) pixels with a 16(H):9(V) frame aspect ratio, as shown for example by the vertically hatched portion of frame D in FIG. 2. It will be appreciated that the output frame size is L'×9L'/16 (where L' is the width of the output frame). Also, each output pixel has an aspect ratio of 16/1920(H):9/1035(V), or 23:24. Thus, not only are the output pixels not square, but their aspect ratio is different to that of the input pixels.

Each frame on line 10 is input to a format converter 14, which outputs a corresponding intermediate frame on line 16 to an image translator/expander 18, which in turn outputs the output frame on line 12. The intermediate frame on line 16 is of SMPTE 240 M format, but the pixel data of the input frame is contained in only part of the intermediate frame, for example in the top-left corner, as shown by the vertically hatched portion of frame B in FIG. 2, and has a size of 3L'/8(H)×243L'/920(V) containing the 720(H)×486(V) pixels. The remaining data in the intermediate frame B is dummy data, as shown by horizontal hatching.

In the translator/expanding 18, the pixel data of the intermediate frame B undergoes a translation of $(t_x, t_y)$, as shown for example by frame C and G in FIG. 2, and then undergoes an expansion about the center pixel of the frame at location (960, 518) by a factor of $(e_x, e_y)$, as shown for example by frames D, E, F and H in FIG. 2.

In the example shown by frame C, the translation $(t_x, t_y)$ is (600, 275) which has the effect of placing the active pixel data (vertically hatched) in the center of the frame.

From frame C, frame D is formed by an expansion $(e_x, e_y)$ of (8/3, 230/81). The horizontal expansion of 8/3 has the effect of extending the width of the active area from 720 pixels to 1920 pixels, so that it is equal to the width of the frame. The vertical expansion of 230/81 has the effect of extending the height of the active area from 486 pixels to 1380 pixels so that the aspect ratio of the image is returned to the originating value L':(1380/1035)×(9L'/16) or 4:3. However, this vertical expansion also has the effect of extending the upper and lower marginal portions of the image outside of the frame D, and therefore these marginal portions, as shown by diagonal hatching above and below frame D, whose heights are each about 172 pixels, are cropped.

As an alternative, from face C, frame E is formed by an expansion $(e_x, e_y)$ of (2, 115/54). The vertical expansion of 115/54 has the effect of extending the height of the active area from 486 pixels to 1035 pixels, so that it is equal to the height of the frame. The horizontal expansion of 2 has the effect of extending the width of the active area from 720 pixels to 1440 pixels so that the aspect ratio of the image is returned to the originating value of 1440L'/1920:9L'/16, or 4:3. However, the horizontal expansion is not sufficient to cause the active areas to extend completely across the frame E, and therefore left and right marginal portions of the frame, whose widths are each 240 pixels, are provided by the dummy data, as shown by the horizontal hatching in frame E.

It will be noted that some of the image has been lost from frame D, which may be acceptable in some cases, but not in others, and that undesirable side bars are produced in frame E. In some cases, an expansion between those for frames D and E may be acceptable, giving less lost image than frame D and narrower side bars than frame E. From frame C, frame F shows an expansion $(e_x, e_y)$ of (7/3, 805/324). The horizontal expansion of 7/3 has the effect of extending the width of the active area from 720 pixels to 1680 pixels, leaving side bars of dummy data each 120 pixels wide. The vertical expansion of 805/324 has the effect of extending the height of the active area from 486 pixels to 1207 pixels so that the aspect ratio of the image is returned to the originating value of 1680L'/1920:(1207/1035)×(9L'/16), or 4:3, and so that top and bottom marginal portions of approximate heights of 86 pixels each are cropped.

It is to be noted that for each of frames D, E and F, the ratio of the horizontal expansion to the vertical expansion $e_x/e_y$ is always the same and is 108/115. This is necessary in order not to distort the image. The value $e_x/e_y$ of 108/115 is derived from the ratio of the pixel aspect ratio of 9:10 for the CCIR 601 525-line format to the pixel aspect ratio of 23:24 for the SMPTE 240 M format, i.e. (9/10)/(23/24)=108/115.

There are cases in which distortion of the picture may be acceptable, for example when titles spread across substantially the whole of the input frame on a relatively less significant background, and it is desired not to lose any of the title information and also to avoid the production of any side bars in the output frame. In these and vertical expansions are such as to cause the active area to extend horizontally from 720 to 1920 pixels and vertically from 486 to 1035 pixels. Thus, an expansion $(e_x, e_y)$ of (8/3, 115/54) is required, where the horizontal expansion $e_x$ is the same as for the edge-crop mode (frame D in FIG. 2) and the vertical expansion $e_y$ is the same as for the side-bars mode (frame E in FIG. 2).

In the examples described so far, the translation $(t_x, t_y)=(600, 275)$ between frames B and C places the active area in the center of frame C, so that there is symmetrical cropping top and bottom in frames D and F, and so that there are symmetrical side bars left and right in frames E and F. In some cases, it may be desirable for the cropping and/or the side bars not to be symmetrical. Frames G and H show an example where it it important for all of the bottom of the input image to be included in the output image, but it does matter if the top is cropped, and it is desired not to have any side bars. In this case, frame G is formed by a translation of $(t_x, t_y)$ of (600, 214) (so that the active portion of the frame G is higher in the frame than in the case of frame C). Frame G then undergoes an expansion $(e_x, e_y)$ of (8/3, 230/81) (which is similar to the expansion between frames C and D). However, because of the modified position of the active area in frame G, the active area in frame H extends exactly across the whole of the frame and extends to the bottom of the frame without cropping. The top marginal portion of the active area, 345 pixel high, is cropped, as indicated by the diagonal hatching. This is referred to as a zoom mode of operation.

In the above examples, the active area of the output frame is either less than the frame width (frame E and F), or is equal to it (frame D and H). If desired, a greater horizontal expansion may be employed (that is $e_x$ may be greater than 8/3), so that the left and/or right marginal portions of the image, in addition to the upper and lower marginal portions, are cropped in the output frame, and the translation $(t_x, t_y)$ may be chosen so that the desired portion of the input image appears in the output frame.

The above examples have considered the case of up-conversion from CCIR 601 525-line format to SMPTE 240 M format. For the other formats mentioned at the beginning of the specification, different translations ($t_x$, $t_y$) and expansions ($e_x$, $e_y$) will be required. For all the formats considered, the size ($P_x$, $P_y$) of the active portion of the frame, the frame aspect ratio $R_f$, and the pixel aspect ratio $R_p$ are as given in Table 1 below:

TABLE 1

| FORMAT | Active Pixels ($P_x$, $P_y$) | Frame Aspect Ratio ($R_f$) | Pixel Aspect Ratio ($R_p$) |
|---|---|---|---|
| SMPTE 240M | (1920, 1035) | 16/9 | 23/24 |
| European HDTV | (1920, 1152) | 16/9 | 16/15 |
| CCIR 601 525-line | (720, 486) | 4/3 | 9/10 |
| CCIR 601 625-line | (720, 576) | 4/3 | 16/15 |
| 4fsc D2 525-line | (768, 486) | 4/3 | 27/32 |
| 4fsc D2 625-line | (948, 576) | 4/3 | 64/79 |

It should be noted that the pixel aspect ratio is given by $R_p = R_f \cdot P_y / P_x$.

The translation ($t_x$, $t_y$) required to bring the active area of the intermediate frame to the center of the frame is given by ($t_x$, $t_y$) = (($P_x'' - P_x'$)/2, ($P_y'' - P_y'$)/2), where ($P_x'$, $P_y'$) and ($P_x''$, $P_y''$) are the sizes, in pixels, of the input and output frames, respectively. Thus, for the possible conversions considered here, the necessary translations are as given by Table 2 below:

TABLE 2

| | | OUTPUT FORMAT | |
|---|---|---|---|
| TRANSLATION TO CENTRE ($t_x$, $t_y$) | | SMPTE 240M | European HDTV |
| INPUT FORMAT | CCIR 601 525-line | (600, 274) | (600, 333) |
| | CCIR 601 625-line | (600, 229) | (600, 288) |
| | 4fsc D2 525-line | (576, 274) | (576, 333) |
| | 4fsc D2 625-line | (486, 229) | (486, 288) |

The expansion ($e_x'$, $e_y'$) required to produce an output frame just with no side bars is given by ($e_x'$, $e_y'$) = (($P_x''/P_x'$), ($P_x''R_p''$)/($P_x'R_p'$)), where $R_p'$ are the pixel aspect ratios for the input and output formats, respectively. Thus, for the possible conversions considered here, the necessary expansions are as given by Table 3 below:

TABLE 3

| | | OUTPUT FORMAT | |
|---|---|---|---|
| EXPANSION ($e_x'$, $e_y'$) NO SIDE BARS | | SMPTE 240M | European HDTV |
| INPUT FORMAT | CCIR 601 525-line | (8/3, 230/81) | (8/3, 256/81) |
| | CCIR 601 625-line | (8/3, 115/48) | (8/3, 8/3) |
| | 4fsc D2 525-line | (5/2, 230/81) | (5/2, 256/81) |
| | 4fsc D2 625-line | (160/79, 115/48) | (160/79, 8/3) |

On the other hand, the expansion ($e_x''$, $e_y''$) required to produce an output frame just with no cropping is given by ($e_x''$, $e_y''$) = (($P_y''R_p'$), ($P_y'R_p''$), ($P_y''/P_y'$)). Thus, for the possible conversions considered here, the necessary expansions are as given by Table 4 below:

TABLE 4

| | | OUTPUT FORMAT | |
|---|---|---|---|
| EXPANSION ($e_x''$, $e_y''$) NO CROPPING | | SMPTE 240M | European HDTV |
| INPUT FORMAT | CCIR 601 525-line | (2, 115/54) | (2, 64/27) |
| | CCIR 601 625-line | (2, 115/64) | (2, 2) |
| | 4fsc D2 525-line | (15/8, 115/54) | (15/8, 64/27) |
| | 4fsc D2 625-line | (120/79, 115/64) | (120/79, 2) |

Also, the expansion ($e_x'$, $e_y''$) required to produce an output frame in the titles mode is given by ($e_x'$, $e_y''$) = (($P_x''/P_x'$), ($P_y''/P_y'$)). Thus, for the possible conversions considered here, the necessary expansions are as given by Table 5 below:

TABLE 5

| | | OUTPUT FORMAT | |
|---|---|---|---|
| EXPANSION ($e_x'$, $e_y''$) TITLES MODE | | SMPTE 240M | European HDTV |
| INPUT FORMAT | CCIR 601 525-line | (8/3, 115/54) | (8/3, 64/27) |
| | CCIR 601 625-line | (8/3, 115/64) | (8/3, 2) |
| | 4fsc D2 525-line | (5/2, 115/54) | (5/2, 64/27) |
| | 4fsc D2 625-line | (160/79, 115/64) | (160/79, 2) |

In the arrangement described above, the active area of the intermediate frame B is placed in the corner of the frame by the format converter 14, and the translator/expander 18 then moves the active area to, or near, the center of the frame (frames C and G) and then expands to active area from a center of expansion at the center of the frame.

In one alternative arrangement, the active area of the frame B may be directly placed by the format converter 14 in the center of the frame. Thus, a frame like frame C in FIG. 2 is directly produced, and no translation, as opposed to expansion, is required to produce the frames D, E and F with symmetrical cropping, side bars, or other effects. In order to produce and asymmetrical frame line frame G, a small amount of translation would need to be provided by the translator/expander 18.

In another alternative arrangement, the active portion of the intermediate frame is placed in a corner or the frame, as shown by frame B in FIG. 2, but the translator/expander 18 does not separately translate and expand the active portion. Instead, the translator/expander 18 expands the active area from a center of expansion which does not coincide with the center of the frame. For example, if frame B as shown in FIG. 2 were expanded with ($e_x$, $E_y$) = (8/3, 230/81) from a center of expansion at the top-left corner of the frame, the result would be as shown by frame H, except that the cropped marginal portion would be at the bottom, rather than the top, of the frame.

As shown in FIG. 1, the format converter 14 and translator/expander 18 are controlled by a system controller 20 which provides signals to the converter 14 and translator/expander 18 controlling: the input and output formats: the translation and expansion provided by the translator/expander 18; and the value of the dummy data. As an alternative, these parameters may be manually set directly, preset, or hand-wired.

Referring now to FIG. 3, further detail of the format converter 14 is shown. The input signal on line 10 is fed to a controllable data input switch 22 and to a synchronisation decoder 24 which detects the horizontal and vertical synchronisation signals in the input signals and supplied timing signals to a selector circuit 26, to write and read address generators 34,40, and to a synchronisation formatter 28 which adds synchronisation signals to the output signal on line 16. The selector 26 controls the data input switch 22 to route the incoming pixel data either to the data input of one field store $30_0$ or to the data input of another field store $30_1$. The selector 26 also controls a controllable write address switch 32 to route write addresses from the write address generator 34 to the address input of the same field store $30_0$ or $30_1$. The converter 14 also includes a controllable data output switch 36 under control of the selector circuit 26, which is controlled to route data read from the field store $30_0$ or $30_1$, which is not being written to, to the line 16. The selector circuit 26 also controls a controllable read address switch 38 to route read addresses from the read address generator 40 to the address input of the field store $30_0$ or $30_1$, which is being read. The selector circuit also supplies read/write enable control signals to the field stores $30_0$, $30_1$. The being written to the field store $30_1$, the odd field of the same frame is being read from the field store $30_0$ and output on line 16.

The input pixels arrive at a rate of 14.3 MHz (which is four times the NTSC sub-carrier frequency) and accordingly, for writing, the write address generator 34 produces sequential write addresses $(p_x, p_y)$ at that rate. The write addresses for an even field of a frame increment in the fashion shown in Table 6 below:

TABLE 6

| (0, 0) | (1, 0) | (2, 0) | (3, 0) | ... | (718, 0) | (719, 0) |
|---|---|---|---|---|---|---|
| (0, 2) | (1, 2) | (2, 2) | (3, 2) | ... | (718, 2) | (719, 2) |
| (0, 4) | (1, 4) | (2, 4) | (3, 4) | ... | (718, 4) | (719, 4) |
| . | . | . | . | ... | . | . |
| . | . | . | . |  | . | . |
| . | . | . | . |  | . | . |
| (0, 484) | (1, 484) | (2, 484) | (3, 484) | ... | (718, 484) | (719, 484) | address generators 34, 40 and the selector circuit 26 also receive control signals from the system controller indicative of the type of input signal format and of the required type of output signal format.

FIG. 3 is a schematic drawing to assist in illustrating the pixel data flow and the address data flow. In practice, the data input switch 22 may be omitted and the input line 10 may be directly connected to the field stores $30_0$, $30_1$, because each field store will ignore input data on line 10 when reading is selected. Also, the field stores may have tri-state outputs, in which case the data output switch 36 is redundant. Furthermore, the address switches 32, 38 may be omitted if the field stores have separate inputs for wire addresses and read addresses.

The operation of the format converter of FIG. 3 will now be described for conversion from 4fsc D2 525-line format to SMPTE 240 M format. As each input frame arrives on line 10, the odd field of the frame is written to the field store $30_0$, and the even field is then written to the field store $30_1$. While the odd field is being written to the field store $30_0$, the even field of the preceding frame is being read from the field store $30_1$ and output on line 16, and while the even field of each frame is Somewhat, similarly, the write addresses for an odd field of a frame increment in the fashion shown in Table 7 below:

TABLE 7

| (0, 1) | (1, 1) | (2, 1) | (3, 1) | ... | (718, 1) | (719, 1) |
|---|---|---|---|---|---|---|
| (0, 3) | (1, 3) | (2, 3) | (3, 3) | ... | (718, 3) | (719, 3) |
| (0, 5) | (1, 5) | (2, 5) | (3, 5) | ... | (718, 5) | (719, 5) |
| . | . | . | . | ... | . | . |
| . | . | . | . |  | . | . |
| . | . | . | . |  | . | . |
| (0, 485) | (1, 485) | (2, 485) | (3, 485) | ... | (718, 485) | (719, 485) |

The output pixels need to be produced at a pixel rate of 74.25 MHz, and dummy pixel data need to be produced for the latter part of each line and for the latter part of each field. The dummy data may be produced either by pre-storing a dummy data element at one particular location in each field store $30_0$, $30_1$, for example at (0, 486) and by pointing to that location whenever dummy data is to be output. Alternatively, field stores $30_0$, $30_1$ may be employed which each have a capacity of one field in the high definition format (i.e. 1920 pixels $\times$ 1035 pixels for SMPTE 240 M format) and dummy data may be pre-stored in that part of each field store $30_0$, $30_1$ to which the input data is not written.

In the first case, the read addresses provided by the read address generator 40 would be incremented in the fashion shown in Table 8 below for the even field of each frame:

TABLE 8

| (0, 0) | (1, 0) | ... | (718, 0) | (719, 0) | (0, 486) × 1200 |
|---|---|---|---|---|---|
| (0, 2) | (1, 2) | ... | (718, 2) | (719, 2) | (0, 486) × 1200 |
| (0, 4) | (1, 4) | ... | (718, 4) | (719, 4) | (0, 486) × 1200 |
| . | . | ... | . | . | . |
| . | . |  | . | . | . |
| . | . |  | . | . | . |
| (0, 484) | (1, 484) | ... | (718, 484) | (719, 484) | (0, 486) × 1200 |
|  |  |  | (0, 486) × 528000 |  |  |

Somewhat similarly, the read addresses provided by the read address generator 40 would be incremented in the fashion shown in Table 9 below for the odd field of each frame:

TABLE 9

| (0, 1) | (1, 1) | ... | (718, 1) | (719, 1) | (0, 486) × 1200 |
|---|---|---|---|---|---|
| (0, 3) | (1, 3) | ... | (718, 3) | (719, 3) | (0, 486) × 1200 |
| (0, 5) | (1, 5) | ... | (718, 5) | (719, 5) | (0, 486) × 1200 |
| . | . | ... | . | . | . |
| . | . |  | . | . | . |
| . | . |  | . | . | . |
| (0, 485) | (1, 485) | ... | (718, 485) | (719, 485) | (0, 486) × 1200 |

TABLE 9-continued (0, 486) × 526080

In the second case, the read addresses provided by the read address generator 40 would be incremented in the fashion shown in Table 10 below for the even field of each frame:

TABLE 10

| (0, 0)    | (1, 0)    | ... | (719, 0)   | (720, 0)   | ... | (1919, 0)    |
| (0, 2)    | (1, 2)    | ... | (719, 2)   | (720, 2)   | ... | (1919, 2)    |
| (0, 4)    | (1, 4)    | ... | (719, 4)   | (720, 4)   | ... | (1919, 4)    |
| .         | .         | ... | .          | .          | ... | .            |
| .         | .         |     | .          | .          |     | .            |
| .         | .         |     | .          | .          |     | .            |
| (0, 484)  | (1, 484)  | ... | (719, 484) | (720, 484) | ... | (1919, 484)  |
| (0, 486)  | (1, 486)  | ... | ...        | ...        | ... | (1919, 486)  |
| .         | .         | ... | ...        | ...        | ... |              |
| .         | .         |     |            |            |     | .            |
| (0, 1034) | (1, 1034) | ... | ...        | ...        | ... | (1919, 1034) |

Somewhat similarly, the read addresses provided by the read address generator 40 would be incremented in the fashion shown in Table 11 below for the odd field of each frame:

TABLE 11

| (0, 1)    | (1, 1)    | ...  | (719, 1)   | (720, 1)   | ... | (1919, 1)    |
| (0, 3)    | (1, 3)    | .... | (719, 3)   | (720, 3)   | ... | (1919, 3)    |
| (0, 5)    | (1, 5)    | ...  | (719, 5)   | (720, 5)   | ... | (1919, 5)    |
| .         | .         | ...  | .          | .          | ... | .            |
| .         | .         |      | .          | .          |     | .            |
| .         | .         |      | .          | .          |     | .            |
| (0, 485)  | (1, 485)  | ...  | (719, 485) | (720, 485) | ... | (1919, 485)  |
| (0, 487)  | (1, 487)  | ...  | ...        | ...        | ... | (1919, 487)  |
| .         | .         | ...  | ...        | ...        | ... |              |
| .         | .         |      |            |            |     | .            |
| (0, 1033) | (1, 1033) | ...  | ...        | ...        | ... | (1919, 1033) |

In the above tables, the addresses to the right of, and/or below, the dashed lines contain the dummy data.

Also, in the above tables, the addresses relate to pixel positions in the picture, but the RAMs of the field stores need not necessarily be organised in this manner, and a conversion may be made between the pixel address and the RAM address. For example, when the scheme of Tables 8 and 9 is used, the RAM address A for the even and odd field stores may be obtained as:

$A = P_x + (1024 p_y/2)$ —even $A = P_x + (1024(p_y-1)/2)$ —odd.

In the case where $p_y$ is represented as a 9-bit number $p_{y8}$ to $p_{y0}$, and $p_x$ is represented as a 10-bit number $p_{x9}$ to $p_{x0}$, this conversion can be simply accomplished by supplying the most significant eight bits $p_{y8}$ to $p_{y1}$ of $p_y$ as the most significant eight bits $A_{17}$ to $A_{10}$ of the RAM address A and supplying the ten bits $p_{x9}$ to $p_{x0}$ of $p_x$ as the least significant ten bits $A_9$ to $A_0$ of the RAM address A. Thus, in this case the RAM of each field store $30_0$, $30_1$ needs to have a capacity of $2^{18}$, or 256 kB. If the apparatus is to be able to convert from CCIR 601 625-line format, or 4 fsc 625 D2 format, for each of which there are 288 pixels vertically in a field, then $p_y$ may be represented by a 10-bit number $p_{y9}$ to $p_{y0}$, of which nine bits $p_{y9}$ to $p_{y1}$ are used, and in this case each field store $30_0$, $30_1$ will need to have a capacity of $2^{19}$, or 0.5 MB.

In the case of the scheme of Tables 10 and 11, the RAM address A for the even and odd field stores may be obtained as:

$A = p_x + (2048 p_y/2)$ —even $A = p_x + (2048(p_y-1)/2)$ —odd.

In the case where $p_y$ and $p_x$ are each represented as 11-bit numbers $p_{y10}$ to $p_{y0}$ and $p_{x10}$ to $p_{x0}$, this conversion can be simply accomplished by supplying the most significant ten bits $p_{y10}$ to $p_{y1}$ of $p_y$ as the most significant ten bits $A_{20}$ to $A_{11}$ of the RAM address A and supplying the eleven bits $p_{x10}$ to $p_{x0}$ of $p_x$ as the least significant eleven bits $A_{10}$ to $A_0$ of the RAM address A. Thus, in the case the RAM of each field store $30_0$, $30_1$ needs to have a capacity of $2^{21}$, or 2MB.

It should be noted that other forms of conversion may be made between the pixel addresses and RAM addresses, or the address generators 34, 40 may be designed to generate addresses which can be directly used by the field stores $30_0$, $30_1$.

It will be appreciated that the dummy data appears, in some cases, in the frames output from the translator/expander 18, for example in the frames E and F shown in FIG. 2. Therefore, the dummy data is preferably chosen to provide a background colour, such as black, or even a background pattern in the second case given above. To this end, in an initialisation procedure of the format converter 14, the data input switch 22 may be moved to third and fourth positions (not shown) to route background pixel data from the system controller 20 to the first and second field stores $30_0$, $30_1$, with the write address generator 34 being controlled to generate the address (0, 486) in the first case mentioned above, or to generate all of the required background data addresses $720 <= p_x 21\ 1919$ and/or $486 < p_y < 1034$ in the second case mentioned above. If this is done, then the active area of the frame B (FIG. 2) is preferably placed by the format converter 14 in the center of the frame.

FIG. 4 shows a system configuration, employing the apparatus described above, for conversion from 525 lines 60 field/s conventional definition format to 1125 lines 60 field/s high definition format. The conventional definition digital signal is supplied via line 10 to the format converter 14 selectively from a conventional definition digital video tape recorder (DVTR) 42, from other digital sources on line 44, or from an analogue video tape recorder (AVTR) 46 via an analogue-to-digital converter 48. The intermediate high definition frames output from the format converter 14 on line 16 may selectively be supplied directly to the translator-/expander 18, or via a high definition DVTR (HDDVTR) 50. The frames output from the translator-/expander 18 on line 12 may be supplied to an HDDVTR 52 or elsewhere. In addition to controlling the format converter 14 and the translator/expander 18, the system controller 20 also controls the input DVTR 42, the input AVTR 46, the intermediate HDDVTR 50 and the output HDDVTR 52 to set tape start and stop positions, etc.

In the conversion from CCIR 601 525-lines format or 4 fsc 525-lines format to SMPTE 240 M format, or from CCIR 601 625-lines format or 4 fsc D2 625-lines format to European HDTV format, there is no substantial change in field or frame rate, and therefore temporal conversion does not need to be considered. (Although the proper field rate of an NTSC signal is 0.1% slow than 60 Hz, that is 59.94 Hz, the converter is run off-line, and therefore the input and output can be both locked at 60 Hz or 59.94 Hz without any adverse effects.) in some cases of conversion from an input format of 50 field/s 2:1 interlaced to an output format of 60 field/s 2:1 interlaced, or vice versa the need for temporal conversion may be ignored, for example if the source material is a static image, such as a still background, or static title. However, in other cases, temporal conversion does need to be taken into account. Nevertheless, in the case of source material such as scrolling titles, a panned background, or computer generated scenes, the movement in the source material can be generated at a rate 5/6 slower, or 6/5 faster than the movement required in the output material and thus provide temporal conversion a priori.

FIG. 5 shows a system configuration, employing the apparatus described above, for conversion from 625 lines 50 field/s conventional definition format to 1125 lines 60 field/s high definition format. Asa in the case of FIG. 4, the conventional definition digital signal is supplied via line 10 to the format converter 14 selectively from a conventional definition digital video tape recorder (DVTR) 42, from other digital sources on line 44, or from an analogue video tape recorder (AVTR) 46 via an analogue-to-digital converter 48. The intermediate high definition frame is output from the format converter 14 on line 16' via a high definition digital frame recorder (HDDFR) 54 to an HDDVTR 56. In a first phase of operation, the part of the system of FIG. 5 described so far is operated in a burst intermittent mode, that is to say a burst of input frames pass from the selected source via the format converter 14 to the HDDFR 54 at the source 50 field/s rate, and then the intermediate frame stored in the HDDFR 54 are output at 60 field/s to the HDDVTR 56 which records at normal speed. This procedure is repeated until all of the source material has been converted. Then, in a second stage of operation, the intermediate frame recorded by the HDDVTR 56 are played back at normal speed and supplied on line 16" to the translator/expander 18 and then to the output HDDVTR 52 or elsewhere.

In one modification to the system of FIG. 5, the HDDFR 54 may be replaced by a pair of HDDFRs and a multiplexer operated under control of the system controller 20 such that while one burst of frames is being output to the HDDVTR 56 by one of the HDDFRs, the next burst of frames can be recorded by the other HDDFR and vice versa. This enables the DVTR 42 to play continuously and the converter 14 to convert continuously in the case of conversion frame a 50 field/s conventional definition format to a 60 field/s high definition format. Alternatively, it enables the HDDVTR 56 to record continuously in the case of conversion from a 60 field/s conventional definition format to a 50 field/s high definition format. These effects may also be obtained by suing an HDDFR 54 which can play and record different fields simultaneously.

In another modification of the system of FIG. 5, as shown in FIG. 6, a conventional definition digital frame recorder (CDDFR) 54' may be placed upstream of the format converter 14, instead of HDDFR 54 downstream of the format converter 14. In this case, a burst of input frames are input from the selected source to the CDDFR 54' at the source 50 field/s rate, and then the frames stored in the CDDFR' are output at 60 field/s via the format converter 14 to the HDDVTR 56 which records at normal speed. As with the FIG. 5 arrangement, this procedure is repeated until all of the source material has been converted. In other respects, the system of FIG. 6 is similar to that of FIG. 5. Accordingly, in one modifications to the system of FIG. 6, the CDDFR 54' may be replaced by a pair of CDDFRs and a multiplexer operated under control of the system controller 20 such that while one bust of frames is being output to the format converter 14 by one of the CDDFRs, the next burst of frames can be recorded by the other CDDFR and vice versa.

As an alternative to using the HDDFR 54 (FIG. 5), or the CDDFR 54' (FIG. 6), an HDDVTR 56 may be employed which is operable in a stunt mode such that it records at 50 field/s and plays back at 60 field/s. The HDDFR 54 (FIG. 5) may be provided by a Sony HDDF-500. The translator/expander 18 may be implemented by a known digital video effects unit (also known as a digital multi effects unit), which, in known manner, can manipulate a field of digital video data to provide effects such as expansion, contraction, panning, clipping and partial overwriting. In this connection reference is directed, for example to K. Blair Benson, "Television Engineering Handbook", McGraw-Hill Book Company, New York, 1986, Chapter 14, the content of which is incorporated herein. The system controller may be implemented using an edite controller such as the Sony VBE 9000.

It will be appreciated than many modifications and developments may be made to the apparatus, system and method described above.

For example, the description above has considered video signal formats which are b 2:1 interlaced, but the invention is equally applicable to progressive scan originated material. In order to maintain resolution and data rate, the stores $30_0$, $30_1$ need in this case to be able to store a whole frame of video signal, rather than one field. Alternatively, the same capacity stores as mentioned above may be used, with a reduced data rate and consequent reduced resolution.

Having described a preferred embodiment of the invention with reference to the accompanying drawings, it is to be understood that the invention is not limited to the precise embodiment and that various changes and modifications thereof may be effected by one skilled in the art without departing from the spirit or scope of the invention as defined in the appended claims.

What is claimed is:

1. An apparatus for up-converting a digital video signal from a first definition format to a second high-definition format, comprising:
   storage means for storing an input field/frame of pixel data in the first format;
   storage control means for controlling the storage means to output the stored pixel data together with dummy data as an intermediate field/frame in the second format, such that the pixel data occupies a continuous active portion of the intermediate field/frame and the dummy data occupies the remainder of the intermediate field/frame; and
   means for processing the intermediate field/frame by expanding the active portion thereof in the vertical and horizontal directions and producing an output field/frame in the second format such that the pixel data extends across substantially the whole of the output field/frame in at least one of the two directions.

2. An apparatus as claimed in claim 1, wherein:
   the first and second formats have different field/frame aspect ratios; and
   the processing means is operable in a side-bar mode to expand the action portion of the intermediate field/frame to an extent such that the active portion extends across substantially the whole of the output field/frame in one of the directions and such that the dummy data occupies at least one marginal portion of the output field/frame.

3. An apparatus as claimed in claim 1, wherein:
   the first and second formats have different field/frame aspect ratios; and
   the processing means is operable in an edge-crop mode to expand the active portion of the intermediate field/frame to an extent such that the active portion extends across substantially the whole of the output field/frame in one of the directions and across more than the output field/frame in the other direction so that at least one marginal portion of the active portion is cropped.

4. An apparatus as claimed in claim 1, wherein:
   the first and second formats have different field/frame aspect ratios; and
   the processing means is operable in a zoom mode to expand the active portion of the intermediate field/frame to an extent such that the active portion extends across more than the whole of the output field/frame in one of the directions and across less than or more than the output field/frame in the other direction.

5. An apparatus as claimed in any of claims 2 to 4, wherein the processing means is operable in the side-bar, edge crop or zoom mode, as the case may be, to expand the intermediate field/frame with different horizontal and vertical expansions such that the ratio of the horizontal to vertical expansion is equal to the ratio of the pixel aspect ratio of the first format to that of the second format.

6. An apparatus as claimed in claim 1, wherein:
   the first and second formats have different field/frame aspect ratios; and
   the processing means is operable in a titles mode to expand the active portion of the intermediate field/frame to an extent such that the active portion extends across substantially the whole of the output field/frame in both of the directions without any substantial cropping of the active portion.

7. An apparatus as claimed in claim 6, wherein:
   said means for processing is selectively operable in a side-bar mode to expand the active portion of the intermediate field/frame to an extend such that the active portion extends across substantially the whole of the output field/frame in one of said directions and such that the dummy data occupies at least one marginal portion of the output field/frame, in an edge-crop mode to expand the active portion of the intermediate field/frame to an extent such that the active portion extends across substantially the whole of the output field/frame in one of said directions and across more than the output field/frame in the other of said directions so that at least one marginal portion of the active portion is cropped, and in a zoom mode to expand the active portion of the intermediate field/frame to an extent such that the active portion extends across more than the whole of the output field/frame in one of said directions and across less than or more than the output field/frame in the other of said directions; and
   said means for processing includes means for selecting operation in any one of said side-bar, edge-crop, zoom and titles modes.

8. An apparatus as claimed in claim 1, wherein the storage control means includes means for adding synchronisation data to the pixel data of the intermediate field/frame.

9. An apparatus for up-converting a digital video signal from a first definition format to a second higher-definition format, comprising:
   storage means having a writing mode for storing an input field/frame of pixel data in the first format and a reading mode;
   storage control means for controlling said storage means in said reading mode to output the stored pixel data together with dummy data as an intermediate field/frame in the second format, such that the pixel data occupies a continuous active portion of the intermediate field/frame and the dummy data occupies the remainder of the intermediate field/frame; said storage control means including means for selecting one of said writing and reading modes of the storage means, and means for generating addresses for the storage means; said means for generating addresses being operable when said writing mode is selected to generate addresses sequentially for the field/frame of pixel data, and when said reading mode is selected to generate addresses sequentially for the field/frame of pixel data, and when said reading mode is selected to generate intermittently lines of addresses corresponding to lines of addresses in the first format; the storage control means being operable to output partial lines of the dummy pixel data between the generation of one line of addresses and the next, and to output lines of the dummy pixel data between the generation of one field/frame of addresses and the next; and means for processing the intermediate field/frame by expanding the active portion thereof in the vertical and horizontal directions and producing an output field/frame in the second format such that the pixel data extends across substantially the whole of the output field/frame in at least one of said directions;

10. An apparatus as claimed in claim 9, wherein a further such storage means is provided, and the storage control means controls the two storage means such that while one is being written to, the other is being read from, and vice versa.

11. An apparatus as claimed in claim 9, wherein:
wherein writing of the, or one of the, storage means is selected, the addresses for that storage means are generated at the pixel rate of the first format; and
when reading of the, or one of the, storage means is selected, the addresses for the storage means are generated at the pixel rate of the second format.

12. An apparatus for up-converting a digital video signal from a first definition format to a second higher-definition format, comprising:
storage means for selectively storing a field/frame of pixel data in the first format and in the second format;
storage control means for controlling the storage means to output the stored pixel data together with dummy data as an intermediate field/frame in the second format, such that the pixel data occupies a continuous active portion of the intermediate field/frame and the dummy data occupies the remainder of the intermediate field/frame; said storage control means including means for selecting one of said writing and reading modes of the storage means, and means for generating addresses for the storage means; said means for generating addresses being operable when said writing mode is selected to generate addresses sequentially for the active portion of said storage means corresponding to a field/frame in the first format, and when said reading mode is selected to generate addresses sequentially corresponding to a field/frame in the second format; the storage means storing the dummy data at addresses not in the active portion thereof; and
means for processing the intermediater field/frame by expanding the active portion thereof in the vertical and horizontal directions and producing an output field/frame in the second format such that the pixel data extends across substantially the whole of the output field/frame in at least one of said directions.

13. A method of up-converting a digital video signal from a first definition format to a second higher-definition format, comprising the steps of:
storing an input field/frame of pixel data in the first format;
reading the stored pixel data interspersed with dummy data as an intermediate field/frame in the second format, such that the previously stored pixel data occupies a continuous active portion of the intermediate field/frame and the dummy data occupies the remainder of the intermediate field/frame; and
expanding the active portion of the intermediate field/frame in the vertical and horizontal directions and producing an output field/frame in the second format such that the previously stored pixel data extends across substantially the whole of the output field/frame in at least one of the two directions.

14. A method as claimed in claim 13, for use in the case where the first and second formats have different field/frame aspect ratios, wherein in the expansion step the active portion of the intermediate field/frame is expanded in a side-bar mode to an extent such that the active portion extends across substantially the whole of the output field/frame in one of the directions and such that the dummy data occupies at least one marginal portion of the output field/frame.

15. A method as claimed in claim 13, for use in the case where the first and second formats have different field/frame aspect ratios, wherein in the expansion step the active portion of the intermediate field/frame is expanded in an edge-crop mode to an extent such that the active portion extends across substantially the whole of the output field/frame in one of the directions and across more than the output field/frame in the other direction so that at least one marginal portion of the active portion is cropped.

16. A method as claimed in claim 13, for use in the case where the first and second formats have different field/frame aspect ratios, wherein in the expansion step the active portion of the intermediate field/frame is expanded in an edge-crop mode to an extent such that the active portion extends across substantially the whole of the output field/frame in one of the directions and across less than or more than the output field/frame in the other direction.

17. A method as claimed in any of claim 14 to 16, wherein in the expansion step the intermediate field/frame is expanded with different horizontal and vertical expansions such that the ratio of the horizontal to vertical expansion is equal to the ratio of the pixel aspect ratio of the first format to that of the second format.

18. A method as claimed in claim 13, for use in the case where the first and second formats have different field/frame aspect ratios, wherein in the expansion step the active portion of the intermediate field/frame is expanded in a title mode to an extent such that the active portion extends across substantially the whole of the output field/frame in both of the directions without any substantial cropping of the active portion.

19. A method as claimed in claim 18 wherein:
in a side-bar mode the active portion of the intermediate field frame is expanded in the expansion step to an extent such that the active portion extends across substantially the whole of the output field/frame in one of the directions and such that the dummy data occupies at least one marginal portion of the output field/frame;
in an edge-crop mode the active portion of the intermediate field/frame is expanded in the expansion step to an extent such that the active portion extends across substantially the whole of the output field/frame in one of the directions and across more than the output field/frame in the other direction so that at least one marginal portion of the active portion is cropped; and
in a zoom mode the active portion of the intermediate field/frame is expanded in the expansion step to an extent such that the active portion extends across more than the whole of the output field/frame in one of the directions and across less than or more than the output field/frame in the other directions; and further comprising the step of selecting operation in any one of said side-bar, edge-crop, zoom and titles modes.

20. A method as claimed in claim 13, further comprising the step of adding synchronisation data to the pixel data of the intermediate field/frame.

21. A method of up-converting a digital video signal from a first definition format to a second higher-definition format, comprising the steps of:
storing an input field/frame of pixel data in the first format, said storing including the step of generating for a storage means addresses which are sequential for the field/frame of pixel data for the first format;
reading the stored pixel data interspersed with dummy data as an intermediate field/frame in the second format, such that the previously stored pixel data occupies a continuous active portion of the intermediate field/frame and the dummy data occupies the remainder of the intermediate field/frame, said reading including the steps of:
generating intermittently for the storage means lines of addresses corresponding to lines of addresses in the first format,
outputting partial lines of the dummy pixel data between the generation of one line of address and the next; and
outputting lines of the dummy pixel data between the generation of one field/frame of addresses and the next; and
expanding the active portion of the intermediate field/frame in the vertical and horizontal directions and producing an output field/frame in the second front such that the previously stored pixel data extends across substantially the whole of the output field/frame in at least one of the two directions.

22. A method as claimed in claim 20, wherein:
in the storing step, the addresses are generated at the pixel rate of the first format; and
in the reading step, the addresses are generated at the pixel rate of the second format.

23. A method of up-converting a digital video signal from a first definition format to a second higher-definition format, comprising the steps of:
initializing a storage means by storing dummy data at addresses in the storage means not in an active portion thereof corresponding to a field/frame in the first format;
storing an input field/frame of pixel data in the first format, said storing including the step of generating for the storage means addresses which are sequential for the active portion of the storage means
reading the stored pixel data interspersed with the dummy data as an intermediate field/frame in the second format, such that the previously stored pixel data occupies a continuous active portion of the intermediate field/frame and the dummy data occupies the remainder of the intermediate field/frame, said reading including the step of generating for the storage means addresses which are sequential for a field/frame in the second format; and
expanding the active portion of the intermediate field/frame in the vertical and horizontal directions and producing an output field/frame in the second format such that the previously stored pixel data extends across substantially the whole of the output field/frame in at least one of the two directions.

* * * * *